(12) United States Patent
Heo et al.

(10) Patent No.: US 11,411,273 B2
(45) Date of Patent: Aug. 9, 2022

(54) SECONDARY BATTERY

(71) Applicant: SAMSUNG SDI CO., LTD., Yongin-si (KR)

(72) Inventors: Chi Hoon Heo, Yongin-si (KR); Hyun Sang Joo, Yongin-si (KR); Jong Dae Kim, Yongin-si (KR); Sung Ho Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 12 days.

(21) Appl. No.: 16/776,854

(22) Filed: Jan. 30, 2020

(65) Prior Publication Data
US 2020/0287172 A1    Sep. 10, 2020

(30) Foreign Application Priority Data

Mar. 5, 2019 (KR) .......................... 10-2019-0025248

(51) Int. Cl.
*H01M 50/116* (2021.01)
*H01M 50/11* (2021.01)
*H01M 50/10* (2021.01)

(52) U.S. Cl.
CPC ................................ *H01M 50/116* (2021.01)

(58) Field of Classification Search
CPC ..... H01M 50/116; H01M 50/11; H01M 50/50
See application file for complete search history.

(56) References Cited

U.S. PATENT DOCUMENTS

| 1,552,414 | A | * | 9/1925 | Apostoloff | .............. | H01M 6/30 429/113 |
| 1,937,046 | A | * | 11/1933 | Schulte | .................. | H01M 6/44 429/159 |
| 2,084,878 | A | * | 6/1937 | Van | .......................... | C09J 7/241 428/356 |
| 2,262,836 | A | * | 11/1941 | Deibel | .................... | H01M 6/08 429/86 |
| 3,922,178 | A | * | 11/1975 | Winger | ................. | H01M 50/00 429/82 |

(Continued)

FOREIGN PATENT DOCUMENTS

| CN | 104576977 A | 4/2015 |
| JP | 2011049066 A | 3/2011 |

(Continued)

OTHER PUBLICATIONS

Extended European Search Report dated Aug. 4, 2020 of the European Patent Application No. 20157778.0 corresponding to this application.

(Continued)

*Primary Examiner* — Kenneth J Douyette
(74) *Attorney, Agent, or Firm* — Lee IP Law, P.C.

(57) ABSTRACT

A secondary battery including an electrode assembly; a can accommodating the electrode assembly; a cap assembly sealing the can; a first insulation member on a side of the electrode assembly, the first insulation member having an opening exposing at least a portion of a bottom surface of the electrode assembly; and a second insulation member on a bottom of the can and facing the bottom surface of the electrode assembly, the second insulation member having an area corresponding to an area of the opening in the first insulation member.

12 Claims, 7 Drawing Sheets

(56) References Cited

U.S. PATENT DOCUMENTS

| | | | | |
|---|---|---|---|---|
| 2008/0254343 | A1* | 10/2008 | Kaplin | H01M 50/317 |
| | | | | 429/53 |
| 2011/0123846 | A1* | 5/2011 | Kim | H01M 50/30 |
| | | | | 429/94 |
| 2011/0189536 | A1 | 8/2011 | Moon et al. | |
| 2013/0209859 | A1 | 5/2013 | Tsuruta et al. | |
| 2015/0104684 | A1 | 4/2015 | Kim et al. | |
| 2017/0346050 | A1* | 11/2017 | Morioka | H01M 50/502 |

FOREIGN PATENT DOCUMENTS

| | | |
|---|---|---|
| JP | 2014-078447 A | 5/2014 |
| KR | 10-0934465 B1 | 12/2009 |
| KR | 10-1116577 B1 | 2/2012 |
| KR | 10-2014-0032713 A | 3/2014 |
| WO | WO 2018/034425 A1 | 2/2018 |

OTHER PUBLICATIONS

Chinese Office action dated Mar. 21, 2022.

\* cited by examiner

SECONDARY BATTERY

CROSS-REFERENCE TO RELATED APPLICATION

Korean Patent Application No. 10-2019-0025248, filed on Mar. 5, 2019, in the Korean Intellectual Property Office, and entitled: "Secondary Battery," is incorporated by reference herein in its entirety.

BACKGROUND

1. Field

Embodiments relate to a secondary battery.

2. Description of the Related Art

A secondary battery is a power storage system that can provide an excellent energy density for converting electrical energy into chemical energy and storing the same. Unlike primary batteries, which cannot be recharged, secondary batteries are rechargeable and may be used in IT devices, such as smart phones, cellular phones, notebook computers, tablet PCs, or the like. Such secondary batteries may have advantageous characteristics including high energy density, high power output and stability.

The above information disclosed in this Background section is only for enhancement of understanding of the background of the described technology and therefore it may contain information that does not form the prior art that is already known in this country to a person of ordinary skill in the art.

SUMMARY

The embodiments may be realized by providing a secondary battery including an electrode assembly; a can accommodating the electrode assembly; a cap assembly sealing the can; a first insulation member on a side of the electrode assembly, the first insulation member having an opening exposing at least a portion of a bottom surface of the electrode assembly; and a second insulation member on a bottom of the can and facing the bottom surface of the electrode assembly, the second insulation member having an area corresponding to an area of the opening in the first insulation member.

The first insulation member may be on an outer edge of the bottom surface of the electrode assembly.

The first insulation member may extend circumferentially along the outer edge of the bottom surface of the electrode assembly such that the opening exposes a center portion of the bottom surface of the electrode assembly.

The first insulation member may cover a bottom portion of a side surface of the electrode assembly.

The first insulation member may wrap around sides of the electrode assembly that are adjacent to the bottom surface of the electrode assembly.

The first insulation member may include a bottom surface portion on an outer edge of the bottom surface of the electrode assembly, and a side surface portion covering the bottom portion of the side surface of the electrode assembly.

The first insulation member may be a one-piece, monolithic structure in which the bottom surface portion continuously extends from the side surface portion.

The bottom surface portion may extend circumferentially along the edge of the bottom surface of the electrode assembly such that the opening exposes a center portion of the bottom surface of the electrode assembly, and the side surface portion may wrap around sides of the electrode assembly that are adjacent to the bottom surface of the electrode assembly.

At least one of the first insulation member and the second insulation member may include an insulating and chemical resistant tape.

At least one of the first insulation member and the second insulation member may include an insulating and chemical resistant paint.

BRIEF DESCRIPTION OF DRAWINGS

Features will be apparent to those of skill in the art by describing in detail exemplary embodiments with reference to the attached drawings in which.

DETAILED DESCRIPTION

Figure 1:
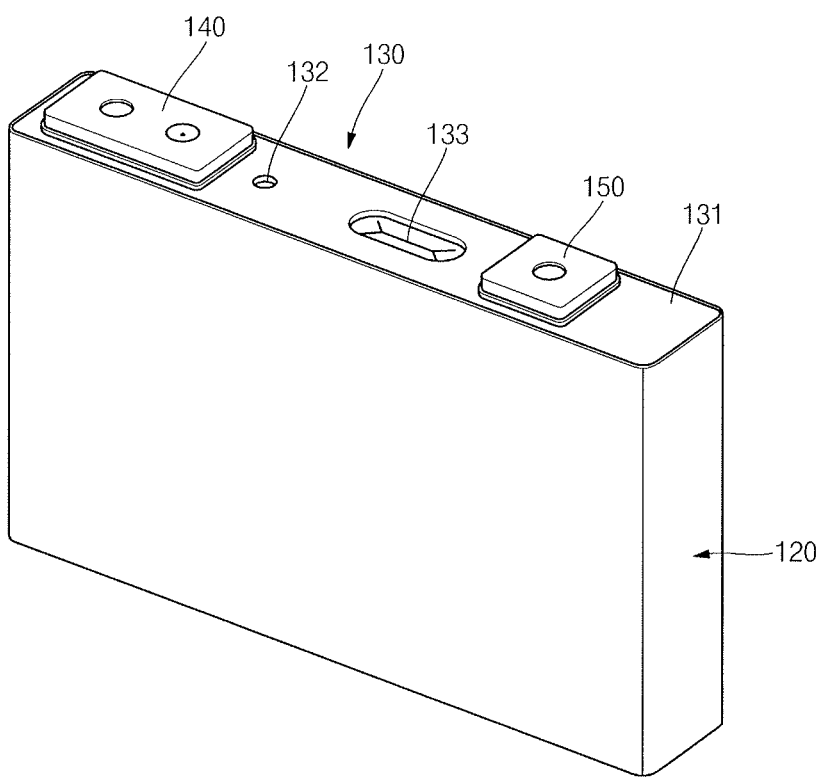
FIG. 1 illustrates a perspective view of a secondary battery according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise.

It will be further understood that the terms that the terms "comprise", "include" "comprising", or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
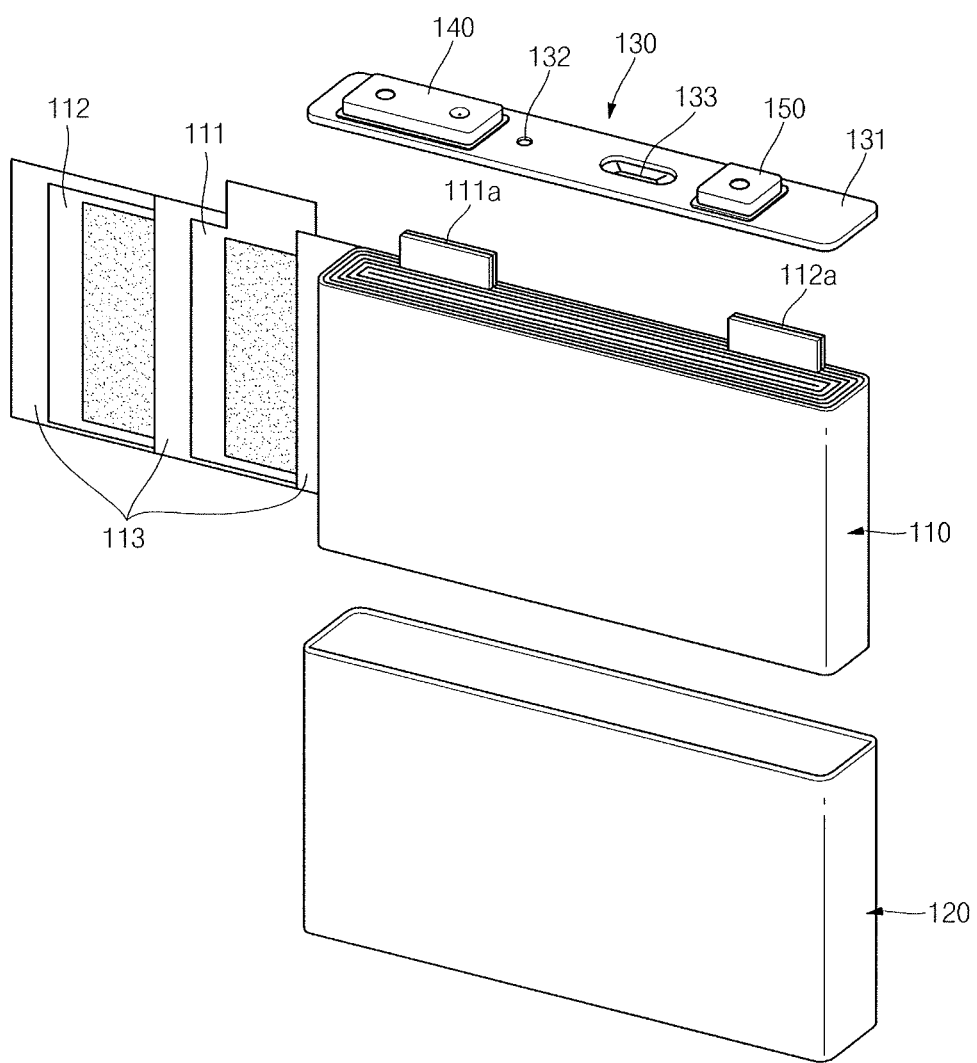
FIG. 2 illustrates an exploded perspective view of a secondary battery according to an embodiment of the present disclosure.
Figure 3:
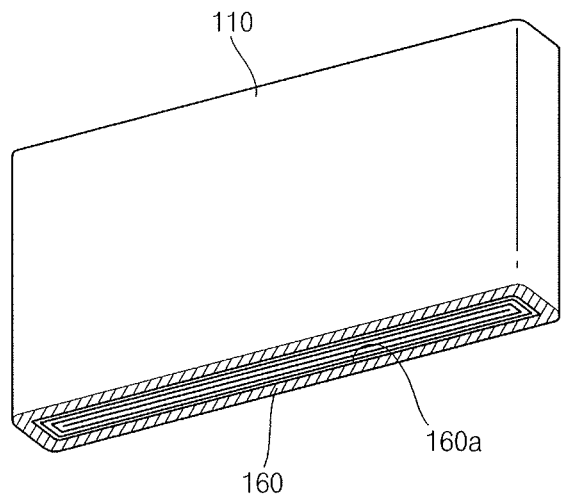
FIG. 3 illustrates a perspective view of an electrode assembly of a secondary battery according to an embodiment of the present disclosure.
Figure 4:
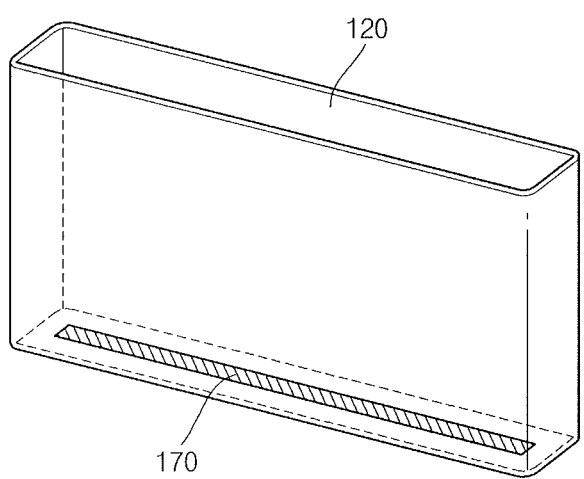
FIG. 4 illustrates a perspective view of a can of a secondary battery according to an embodiment of the present disclosure.

FIG. 1 illustrates a perspective view of a secondary battery 100 according to an embodiment of the present disclosure, and FIG. 2 illustrates an exploded perspective view of the secondary battery 100 shown in FIG. 1. FIG. 3 illustrates a perspective view of an electrode assembly 110 of the secondary battery 100 shown in FIG. 1. FIG. 4 illustrates a perspective view of a can 120 of the secondary battery 100 shown in FIG. 1, illustrating the interior of the can 120.

Referring to FIGS. 1 to 4, the secondary battery 100 may include the electrode assembly 110, the can 120, a cap assembly 130, a first terminal 140, a second terminal 150, a first insulation member 160, and a second insulation member 170.

In an implementation, the electrode assembly 110, including a first electrode plate 111, a second electrode plate 112 and a separator 113, as shown in FIG. 2, may be wound in a jelly-roll configuration. Here, the first electrode plate 111 may be a positive electrode plate and the second electrode plate 112 may be a negative electrode plate, or vice versa.

The first electrode plate 111 may include a first electrode collector and a first electrode active material coated on a portion of the first electrode collector. Here, a portion of the first electrode collector, on which the first electrode active material is not coated, (to be referred to as a first electrode uncoated portion 111a) may function as a passage for current flowing between the first electrode plate 111 and an exterior of the first electrode plate 111. IN an implementation, if the first electrode plate 111 is a positive electrode plate, the first electrode collector may be made of a metal foil made of, e.g., aluminum or an aluminum alloy, and the first electrode active material may include, e.g., a transition metal oxide. In an implementation, the first electrode uncoated portion 111a may include a plurality of first electrode uncoated portions, which may all protrude a predetermined height from the electrode assembly 110 to be aligned at one side (e.g., at the left) of a top end of the electrode assembly 110.

The second electrode plate 112 may include a second electrode collector and a second electrode active material coated on a portion of the second electrode collector. Here, a portion of the second electrode collector, on which the second electrode active material is not coated, (to be referred to as a second electrode uncoated portion 112a) may function as a passage for current flowing between the second electrode plate 112 and an exterior of the second electrode plate 112. In an implementation, if the second electrode plate 112 is a negative electrode plate, the second electrode collector may be made of a metal foil made of, e.g., copper or nickel, and the second electrode active material may include, e.g., graphite or carbon. In an implementation, the second electrode uncoated portion 112a may include a plurality of second electrode uncoated portions, which may all protrude a predetermined height from the electrode assembly 110 to be aligned at the other side (e.g., at the right) of the top end of the electrode assembly 110.

The separator 113 may be between the first electrode plate 111 and the second electrode plate 112 to help prevent or substantially prevent electrical short circuits from occurring between the first electrode plate 111 and the second electrode plate 112 and to facilitate movement of lithium ions. In an implementation, the separator 113 may be made of, e.g., polyethylene, polypropylene, or a composite film made of polypropylene and polyethylene.

The can 120 may accommodate the electrode assembly 110 with an electrolyte. In an implementation, as illustrated in the drawings, the can 120 may have an internal space and may have a generally hexahedral shape having a top opening. The can 120 may be made of a conductive metal, e.g., aluminum or an aluminum alloy. In an implementation, the electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiBF_4$ or $LiPF_6$.

The cap assembly 130 may include a cap plate 131, a plug 132, and a safety vent 133.

The cap plate 131 may be coupled to the top end of the can 120 by, e.g., laser welding, to seal the can 120, and may be made of the same material as the can 120. In addition, the cap plate 131 may include an electrolyte injection hole for injecting the electrolyte into the internal space of the can 120, and a vent hole for exhausting the internal pressure of the can 120.

The plug 132 may function to close the electrolyte injection hole after the electrolyte is injected into the space of the can 120 through the electrolyte injection hole.

The safety vent 133 may be installed on the vent hole and may have a notch easily cut when the internal pressure of the can 120 reaches a predetermined pressure, thereby definitively exhausting the internal pressure of the can 120.

The first terminal 140 may be made of a metal and may be electrically connected to the first electrode uncoated portion 111*a* of the first electrode plate 111. For example, as stated above, if the first electrode plate 111 is a positive electrode plate, the first terminal 140 may function as a positive electrode terminal.

The first terminal 140 may upwardly protrude from the cap plate 131 as a whole, and may be integrally formed with the cap plate 131 by forging when producing the cap plate 131.

The second terminal 150 may be made of a metal and may be electrically connected to the second electrode uncoated portion 112*a* of the second electrode plate 112. For example, as stated above, if the second electrode plate 112 is a negative electrode plate, the second terminal 150 may function as a negative electrode terminal.

The first insulation member 160 may be provided at a side of the electrode assembly 110. For example, the first insulation member 160 may include an opening 160*a* to allow at least a portion of the bottom surface of the electrode assembly 110 to be directly exposed to the internal space of the can 120.

In an implementation, as shown in FIG. 3, the first insulation member 160 may be located along an edge of the bottom surface of the electrode assembly 110 (e.g., may partially cover an outer circumferential portion of the bottom surface of the electrode assembly 110). For example, the opening 160*a* may downwardly expose the center of the bottom surface of the electrode assembly 110.

In an implementation, the first insulation member 160 may include an insulating and chemical resistant tape which does not react at all with or does not substantially react with an electrolyte. In this case, the first insulation member 160 may be provided along the edge of the bottom surface of the electrode assembly 110 in the shape of a ring to then be attached to the bottom surface of the electrode assembly 110.

In an implementation, the first insulation member 160 may include an insulating and chemical resistant paint (e.g., UV paint, baking paint, or powder coating) which does not react at all with or does not substantially react with an electrolyte. For example, the first insulation member 160 may be provided along the edge of the bottom surface of the electrode assembly 110.

The second insulation member 170 may be provided on the bottom of the can 120, as shown in FIG. 4.

For example, the second insulation member 170 may be sized to have an area corresponding to or complementing the area of the opening 160*a* of the first insulation member 160. For example, the area of the second insulation member 170 may be substantially equal to or slightly larger than that of the opening 160*a* of the first insulation member 160.

In an implementation, the second insulation member 170 may be located to correspond to or be aligned with the opening 160*a* of the first insulation member 160 when the can 120 accommodates the electrode assembly 110.

In an implementation, the second insulation member 170 may be made of an insulating and chemical resistant tape to be attached to the bottom of the can 120 or may be made of an insulating and chemical resistant paint to be coated on the bottom of the can 120.

In an implementation, the insulation between the electrode assembly 110 and the can 120, e.g., between the bottom surface of the electrode assembly 110 and the bottom (e.g., inner bottom surface) of the can 120, may be secured by the first insulation member 160 and the second insulation member 170. For example, the insulation of a portion corresponding to the edge of the bottom surface of the electrode assembly 110 may be be secured by the first insulation member 160, and the insulation of a portion corresponding to the center of the bottom surface of the electrode assembly 110, e.g., the portion corresponding to the opening 160*a* of the first insulation member 160, may be secured by the second insulation member 170.

In addition, the bottom surface of the electrode assembly 110 may be partially exposed through the opening 160*a* of the first insulation member 160, and the electrolyte impregnating capability for the electrode assembly 110 may be improved.

In addition, as stated above, the first insulation member 160 and the second insulation member 170 may be made of tapes or paints, and the effects of increasing battery capacity, saving component costs, and the like, may be achieved, compared with using separate thick insulation blocks.

Figure 5:
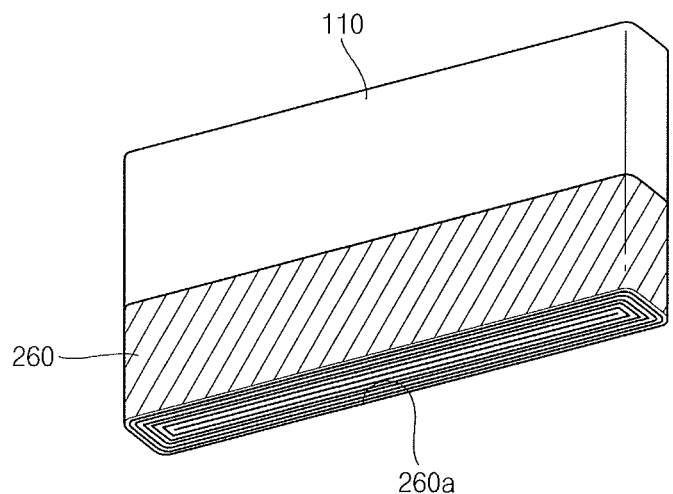
FIG. 5 illustrates a perspective view of an electrode assembly of a secondary battery according to another embodiment of the present disclosure.
Figure 6:
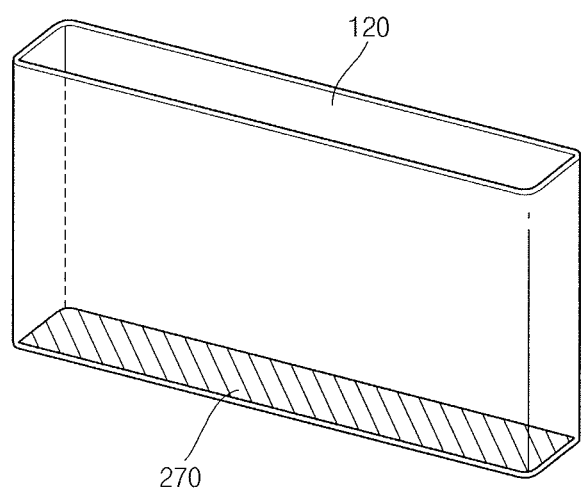
FIG. 6 illustrates a perspective view of a can of a secondary battery according to another embodiment of the present disclosure.

FIG. 5 illustrates a perspective view of an electrode assembly 110 of a secondary battery according to another embodiment of the present disclosure, showing the electrode assembly 110 viewed from below. FIG. 6 illustrates a perspective view of a can 120 of the secondary battery according to another embodiment of the present disclosure, showing the interior of the can 120.

The secondary battery according to the present embodiment maybe substantially the same as the secondary battery 100 described above with reference to FIGS. 1 to 4, except for configurations of a first insulation member 260 and a second insulation member 270. Repeated explanations of similar elements may be omitted.

Referring to FIG. 5, the first insulation member 260 may include an opening downwardly expositing the entire bottom surface of the electrode assembly 110. For example, the first insulation member 260 may cover a bottom portion (e.g., a portion of the electrode assembly 110 proximate to the bottom end of the can 120) of the side surface of the electrode assembly 110. For example, the first insulation member 260 may wrap around sides of the electrode assembly 110 that are adjacent to the bottom end of the electrode assembly 110 (e.g., the end of the electrode assembly 110 that is inserted into the can 120).

For example, the area of the opening 260*a* may be maximized, thereby further improving electrolyte impregnating capability for the electrode assembly 110 and preventing unwinding of the electrode assembly 110.

In this case, the second insulation member 170 may be sized to have an area corresponding to the entire bottom of the can 120 (and correspondingly the entire bottom surface of the electrode assembly 110), as shown in FIG. 6.

Figure 7:
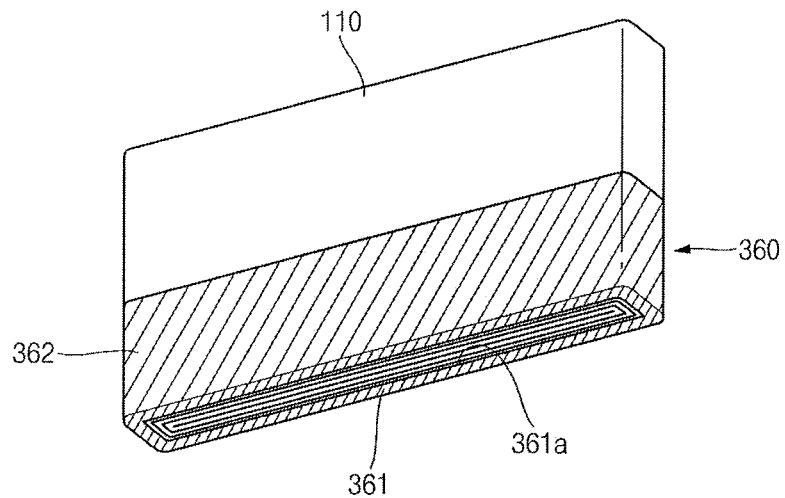
FIG. 7 illustrates a perspective view of an electrode assembly of a secondary battery according to still another embodiment of the present disclosure.
Figure 8:
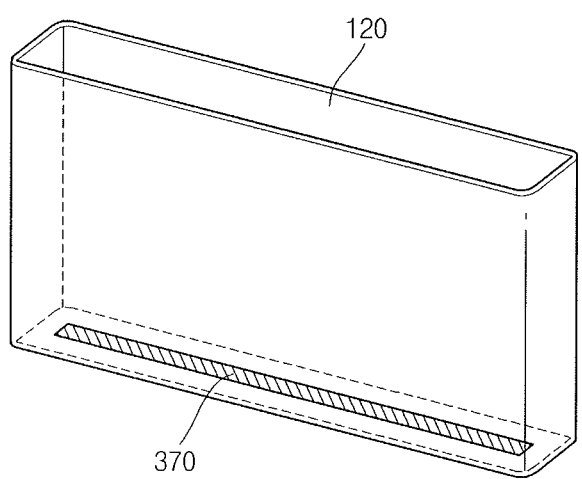
FIG. 8 illustrates a perspective view of a can of a secondary battery according to still another embodiment of the present disclosure.

FIG. 7 illustrates a perspective view of an electrode assembly 110 of a secondary battery according to still another embodiment of the present disclosure, showing the electrode assembly 110 viewed from below. FIG. 8 illustrates a perspective view of the can 120 of the secondary battery according to still another embodiment of the present disclosure.

The secondary battery according to the present embodiment may be substantially the same as the secondary battery 100 described above with reference to FIGS. 1 to 4, except for the configuration of a first insulation member 360. Repeated explanations of similar elements may be omitted.

Referring to FIG. 7, the first insulation member 360 may have a bottom surface portion 361 and a side surface portion 362.

The bottom surface portion 361 may include an opening 361*a* downwardly exposing a portion of the bottom surface of the electrode assembly 110. For example, the bottom surface portion 361 may be located along the edge of the bottom surface of the electrode assembly 110, and the opening 361a may downwardly expose the center of the bottom surface of the electrode assembly 110 (e.g., similar to the configuration illustrated in FIG. 3).

The side surface portion 362 may cover the bottom portion of the side surface of the electrode assembly 110 (e.g., similar to the configuration illustrated in FIG. 5).

For example, the bottom surface portion 361 of the first insulation member 360 may be similarly configured to the first insulation member 160 of the secondary battery 100 described above with reference to FIGS. 1 to 4, and the side surface portion 362 may be similarly configured as to the first insulation member 260 of the secondary battery according to another embodiment described with reference to FIGS. 5 and 6. For example, the first insulation member 360 may have a structure corresponding with a combination of the structures of the first insulation members 160 and 260 of FIGS. 3 and 5. For example, the first insulation member 360 may be a one-piece, monolithic structure including the bottom surface portion 361 continuously extending from the side surface portion 362.

In an implementation, a second insulation member 370 may be sized to have an area corresponding to or complementing the opening 361a of the bottom surface portion 361 of the first insulation member 360, as shown in FIG. 8, and the second insulation member 370 may be located to correspond to or be aligned with the opening 361a of the bottom surface portion 361 of the first insulation member 360 when the can 120 accommodates the electrode assembly 110.

Figure 9:
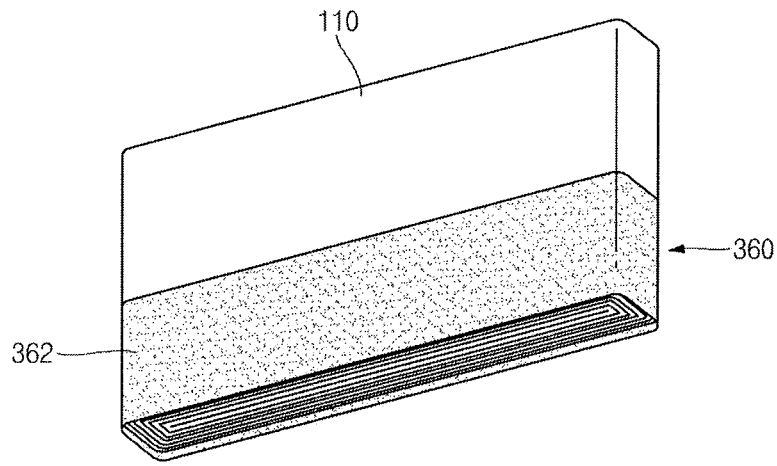
FIGS. 9 to 11 illustrate stages in a process of attaching a first insulation member to an electrode assembly of a secondary battery according to an embodiment of the present disclosure.
Figure 10:
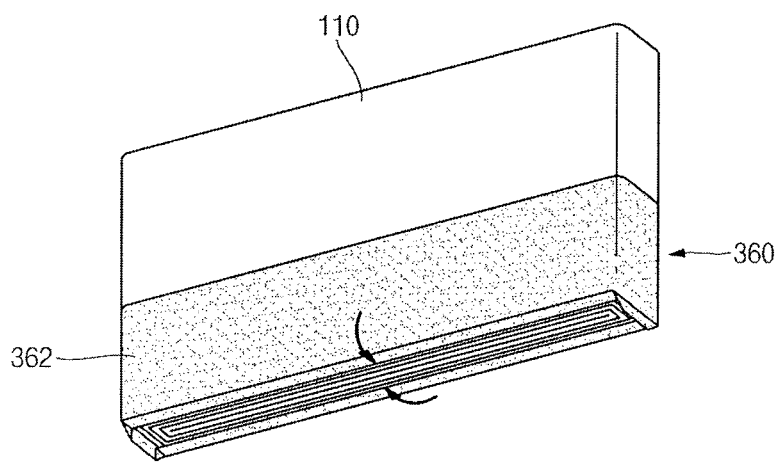
Figure 11:
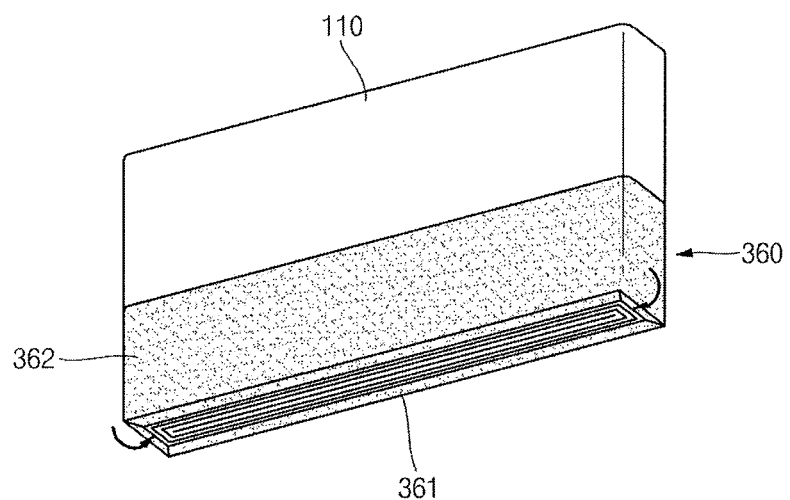

FIGS. 9 to 11 illustrate stages in a process of attaching the first insulation member 360 to the electrode assembly 110 in the secondary battery according to an embodiment of the present disclosure, when the first insulation member 360 includes a tape.

First, when the first insulation member 360 includes a tape, the tape may have an approximately rectangular shape, the horizontal length of which is substantially equal to or slightly larger than the edge of the side surface of the electrode assembly 110.

As shown in FIG. 9, the first insulation member 360 may be attached to the electrode assembly 110 so as to cover the bottom portion of the side surface of the electrode assembly 110. For example, the first insulation member 360 may be attached to the electrode assembly 110 to make the bottom end of the first insulation member 360 protrude over or beyond a bottom end of the electrode assembly 110.

Here, a portion of the first insulation member 360, which covers the bottom portion of the side surface of the electrode assembly 110, may be the side surface portion 362 described above.

Next, as shown in FIGS. 10 and 11, a portion of the first insulation member 360, which protrudes beyond the bottom end of the electrode assembly 110, may be inwardly folded to be attached to the bottom surface of the electrode assembly 110.

Here, the inwardly folded portion may be the bottom surface portion 361 described above. In addition, a region of the bottom surface of the electrode assembly 110, which the bottom surface portion 361 does not reach, may be the opening 361a. The area of the opening 361a may be appropriately adjusted according to the length of the portion of the first insulation member 360, which protrudes beyond the bottom end of the electrode assembly 110, as shown in FIG. 9, e.g., the inwardly folded portion, as shown in FIGS. 10 and 11.

In addition, the second insulation member 370 may be provided on the bottom of the can 120, and the electrode assembly 110 may then be inserted into the can 120, followed by sealing the can 120 by the cap assembly 130, thereby completing the secondary battery according to the present disclosure.

In an implementation, a manufacturing method of such a secondary battery may include steps of providing the second insulation member 370 on the bottom of the can 120 and attaching the first insulation member 360 to the electrode assembly 110, or the steps may be performed substantially at the same time.

One or more embodiments may provide a secondary battery capable of improving an electrolyte impregnating capability for an electrode assembly, while securing insulation between the electrode assembly and a can.

One or more embodiments may provide a secondary battery including a first insulation member and a second insulation member between the bottom surface of the electrode assembly and the bottom of the can, thereby securing insulation between the electrode assembly and the can. In addition, the first insulation member may include an opening allowing at least a portion of the bottom surface of the electrode assembly to be directly exposed to the internal space of the can, thereby improving the electrolyte impregnating capability for the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a can accommodating the electrode assembly and having a closed bottom;
a cap assembly sealing the can;
a first insulation member on a side of the electrode assembly, the first insulation member having an opening exposing at least a portion of a bottom surface of the electrode assembly; and
a second insulation member on an inner surface of the bottom of the can and facing the bottom surface of the electrode assembly such that the second insulation member is entirely between the electrode assembly and the inner surface of the bottom of the can, the second insulation member having an area corresponding to an area of the opening in the first insulation member.

2. The secondary battery as claimed in claim 1, wherein the first insulation member is on an outer edge of the bottom surface of the electrode assembly.

3. The secondary battery as claimed in claim 2, wherein the first insulation member extends circumferentially along the outer edge of the bottom surface of the electrode assembly such that the opening exposes a center portion of the bottom surface of the electrode assembly.

4. The secondary battery as claimed in claim 1, wherein the first insulation member covers a bottom portion of a side surface of the electrode assembly.

5. The secondary battery as claimed in claim 4, wherein the first insulation member wraps around sides of the electrode assembly that are adjacent to the bottom surface of the electrode assembly.

6. The secondary battery as claimed in claim 4, wherein the first insulation member includes:
a bottom surface portion on an outer edge of the bottom surface of the electrode assembly, and
a side surface portion covering the bottom portion of the side surface of the electrode assembly.

7. The secondary battery as claimed in claim 6, wherein the first insulation member is a one-piece, monolithic structure in which the bottom surface portion continuously extends from the side surface portion.

8. The secondary battery as claimed in claim 6, wherein:
the bottom surface portion extends circumferentially along the edge of the bottom surface of the electrode assembly such that the opening exposes a center portion of the bottom surface of the electrode assembly, and
the side surface portion wraps around sides of the electrode assembly that are adjacent to the bottom surface of the electrode assembly.

9. The secondary battery as claimed in claim 1, wherein at least one of the first insulation member and the second insulation member includes an insulating and chemical resistant tape.

10. The secondary battery as claimed in claim 1, wherein at least one of the first insulation member and the second insulation member includes an insulating and chemical resistant paint.

11. The secondary battery as claimed in claim 1, wherein the cap assembly further includes a safety vent therein, the vent being breakable in response to an increase in internal pressure of the secondary battery above a predetermined pressure.

12. The secondary battery as claimed in claim 1, wherein the secondary battery is a hexahedral battery.

* * * * *